Jan. 12, 1937.                L. H. PADDLE                2,067,679
                    ULTRA SHORT WAVE OSCILLATION GENERATOR
                       Filed July 11, 1936          2 Sheets-Sheet 1

Inventor:
Leslie Harold Paddle,
By Potter, Pierce & Scheffler,
Attorneys.

Jan. 12, 1937.　　　　L. H. PADDLE　　　　2,067,679
ULTRA SHORT WAVE OSCILLATION GENERATOR
Filed July 11, 1936　　　2 Sheets-Sheet 2

Inventor:
Leslie Harold Paddle,
By Potter, Pierce & Scheffler,
Attorneys.

Patented Jan. 12, 1937

2,067,679

UNITED STATES PATENT OFFICE 2,067,679

ULTRA SHORT WAVE OSCILLATION GENERATOR

Leslie Harold Paddle, London, England

Application July 11, 1936, Serial No. 90,213
In Great Britain January 3, 1935

13 Claims. (Cl. 250—36)

This invention relates to systems or generators for producing ultra short wave oscillations, that is oscillations having a wave length of four metres or less. It is an object of the invention to provide an oscillator of this type which will have a high efficiency, be free from hand capacity or kindred effects and additionally produce oscillations of great stability.

It is well known that oscillations corresponding to a wave length of approximately five to ten metres can be produced by connecting an oscillatory circuit between the grid and anode of a three electrode thermionic valve and by isolating the cathode by suitable short wave chokes from the rest of the circuit. Under these conditions high frequency currents apparently flow through the anode-cathode and grid-cathode capacities in series, producing differences of potential between the grid and cathode, which being in the right sense, cause the valve to oscillate.

The wavelength of the oscillations produced in this way is given by $$\lambda = K\sqrt{LC}$$

where $\lambda$ is the wavelength, K a constant and L and C are the inductance and capacity of the oscillating circuit, including the inductance of the various leads in addition to the inductance deliberately incorporated and including also the internal valve capacities in addition to any extraneous capacities such as that caused by the valve base. Usually the stray capacities can be reduced to a very low value, the main capacity across the inductance being the internal valve capacities. If the inductance be reduced to a very low value it is possible, provided that the external capacities, such as that caused by the valve base are eliminated, to cause the valve to oscillate at wavelengths as low as two metres. If the inductance is reduced to such an extent as to cause the value of the term $$\frac{L}{RC}$$

to fall below a certain level, however, the efficiency is reduced to such a level that the oscillations tend to be very weak or the system tends to stop oscillating.

Hence any attempt to decrease the wavelength of the oscillation by reduction of inductance alone is unsatisfactory and owing to the low value of $$\frac{L}{CR}$$

which governs the efficiency of the system, an oscillator of this type oscillating at a low wavelength will tend to stop in the event of high frequency power being absorbed from the valve, such as would be the case if a radiating aerial were coupled to the oscillator circuit.

It will thus be apparent that in an oscillator of this type a very important factor is the value of the inter-electrode capacities of the valve and that a reduction of the inter-electrode capacity in a tuned circuit renders possible a decrease of wavelength.

I have found that it is possible to operate two or more valves in conjunction with each other in such manner as to cause the valves to aid each other in producing oscillations. According to the invention there is provided a system for producing electromagnetic oscillations of ultra shortwave length which comprises a plurality of thermionic valves so connected with one another and an associated circuit comprising inductance that the internal capacities of the valves are in series with each other across the inductance and together with said inductance determine the frequency of the oscillations produced.

In the accompanying drawings are shown diagrammatically an oscillator of known form and various embodiments of the invention in which:—

Figure 1:
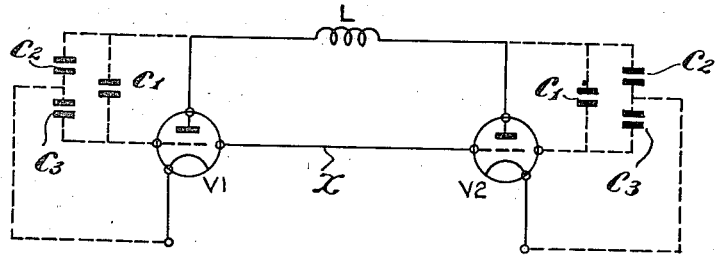
Fig. 1 is a schematic diagram illustrating the essential elements of an oscillator embodying the invention.

In the drawings, the reference characters V1 and V2 identify a pair of vacuum tubes or electronic valves each having a control grid operating with a cathode and anode. The inherent anode-grid, anode-cathode and grid-cathode capacities are indicated by the condensers C1, C2 and C3, respectively, and these capacities cooperate with the inductance L, connected between the tube anodes, to determine the oscillating frequency of the generator. The oscillating circuit is completed by the substantially inductance-free connection X between the grids of the valves. The grid-anode capacities C1 of the valves V1 and V2 are in series with each other and with the inductance L, and these serially connected capacities are shunted by the four serially arranged capacities C2 and C3 of the respective valves. The capacitance C which each valve places in series with the inductance L is determined primarily by the anode-grid capacity C1 and, for convenience of description in the following specification and claims, the effective tuning capacitance C of each valve will be referred to as the grid-anode capacity.

The valves V1 and V2 will usually be of the same type with identical or approximately identical electrical characteristics. When the effective inter-electrode capacities C of the valves are equal, it is apparent that the series tuning capacitance that resonates with inductance L is equal to $$\frac{C}{2}$$

and the wave length of the resonant circuit is therefore equal to $$\frac{1}{\sqrt{2}}$$

times the wave length of an oscillator of the single valve type having an inductance L and feedback between grid and anode to maintain oscillation. Furthermore, the effective reduction of the tuning capacitance to one-half that of each valve makes it possible to reduce the magnitude of the inductance L for the same value of the critical ratio $$\frac{L}{CR}$$

below which it is not practical to obtain stable oscillator operation.

Figure 2:
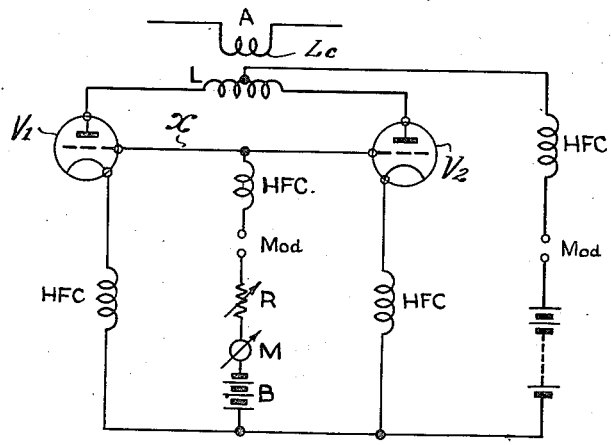
Fig. 2 is a circuit diagram of a practical form of a two tube embodiment of the invention.

A detailed circuit arrangement of the general type illustrated schematically in Fig. 1 is shown in Figure 2. High frequency chokes HFC are included in the cathode leads, and in the common anode and grid leads of the valves V1 and V2. The anodes are connected to the terminals of an inductance L, which may take the form of a turn or half turn of a conductor, to the centre point of which anode current is fed to the two valves. The grid circuits are completed through a variable resistance R, meter M and bias battery B. The resistance R permits the bias on the valves when oscillating to be varied by controlling the grid current while the battery permits the mean potential of the grid to be adjusted to a suitable value.

Energy is fed from the oscillating circuit by a coil Lc coupled to L which may suitably be connected to a dipole aerial A. A considerable advantage of a circuit such as that of Figure 2 is that as the valves are working in a normal manner, normal methods of modulation may be employed and modulating potentials may be applied to either pair of terminals Mod to produce a modulated carrier wave on the aerial A. A fairly deep percentage modulation is possible and modulation does not vary the oscillation frequency to any great extent.

Figure 3:
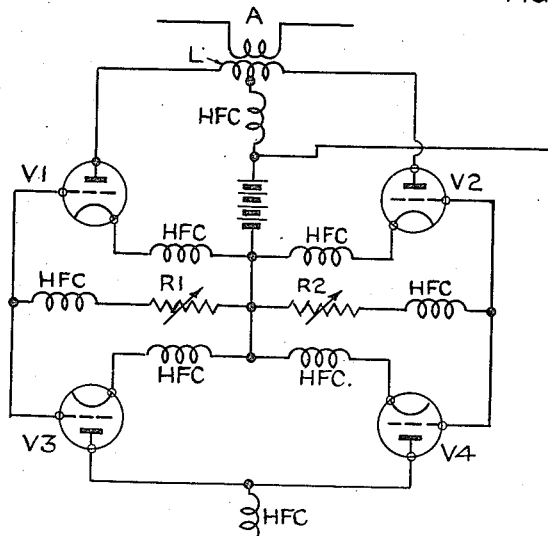
Figs. 3 and 4 are circuit diagrams of oscillators which include a plurality of pairs of tubes.

The oscillator shown in Figure 3 is similar to that of Figure 2 in arrangement except that four triode valves V1 to V4 are employed, so arranged that the grid-anode capacities are in series with the inductance L. Resistances R1 and R2 are included for the control of grid bias as before, and either grid or anode modulation may be employed. Since the four valves all assist in the generation of the oscillations, the power output is greater than that which is possible with the single pair of valves shown in Figs. 1 and 2. I have found it possible, employing four valves in the manner indicated, to generate 70 cm. waves of considerable power, and with an efficiency very much superior to that of the arrangements previously employed.

In order that the utmost power may be extracted from the circuit it is desirable that the inductance of the circuit should be lumped, since, in general, this inductance forms the output impedance of the oscillator.

I have found, however, that in using four or more valves in co-operation, the incidental capacities of the circuit, and in particular capacities existing between the pairs of connected grids, for example between V1 V3 and V2 V4, tend to alter the phase of that part of the circuit remote from the inductance, thereby decreasing the possible output of the oscillator.

Figure 4:
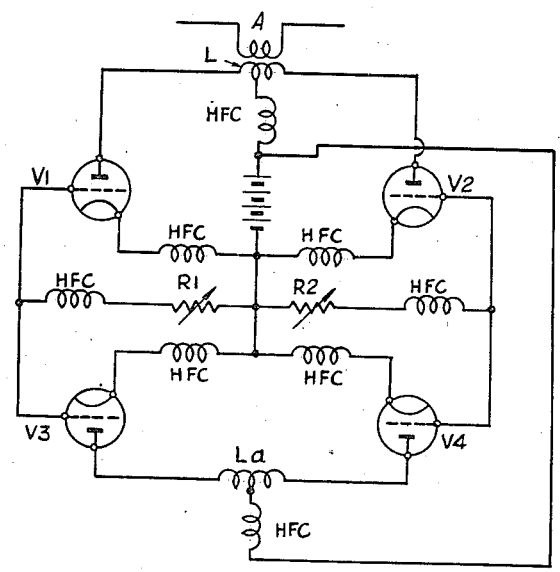

A similar objection applies to the circuit if the anodes are directly connected and inductance is included between a pair of grids. To overcome this disadvantage I modify the circuit of Figure 3 in the manner shown in Figure 4, by the inclusion of an inductance La between the anodes of the valves V3 V4.

The four valves V1 to V4 are arranged so that the grids may be connected by leads as far as possible of negligible inductance. It is impossible, when employing four separate valves, to make the leads devoid of inductance, but the inductance should be comparatively low.

The anodes of V1 and V2 are arranged as before with an inductance L, which may be split and have a tuning condenser inserted therein, connected between them, and the inductance may consist of a half turn of conductor or a lecher wire.

The anodes of V3 and V4 are also connected with an inductance La between them. It will be seen that the four valves, so connected, are virtually two oscillation generators, of the type previously described and each comprising two valves, arranged in series.

In using six valves, I also prefer to use two inductances, arranged at opposite points, symmetrically in the circuit either, as with four valves, between pairs of anodes or pairs of grids, but with eight valves four inductances are preferably incorporated.

The present invention has proved very successful in practice and enables a stable, efficient oscillator to be built, which is superior to known forms of short wave oscillators.

What I claim and desire to secure by Letters Patent is:—

1. An ultra short wave generator comprising a pair of vacuum tubes each having a control grid cooperating with a cathode and an anode; a single series-tuned resonant circuit determining the operating frequency of the generator, said resonant circuit comprising inductance connected between the anodes of the tubes, the capacities between the anodes and grids of the respective tubes, and a substantially inductance-free connection between the grids of said tubes; a choke having a high impedance at the oscillation frequency connected between the cathodes of said tubes; a cathode-anode circuit for each tube; a grid-cathode circuit for each tube; and an output circuit coupled to said inductance.

2. An ultra short wave generator as claimed in claim 1, wherein one of said cathode-connected circuits includes means for the introduction of a modulation frequency.

3. An ultra short wave generator as claimed in claim 1, wherein the grid-cathode circuit of each tube includes means having a high impedance at the oscillation frequency, whereby the cathode of each tube may oscillate in frequency with respect to the grid of that tube.

4. An ultra short wave generator comprising an even number of tubes each having a control grid cooperating with a cathode and an anode; means for impressing energizing potentials between cathode and grid and between cathode and anode of each tube; choke means connected between the cathodes of said tubes; and a single series-tuned circuit comprising the grid anode capacities of the several tubes in series with an inductance connected between the anodes of a pair of said tubes, and a substantially inductance-free connection from the grid of one tube of that pair to the grid of another tube; said series-tuned circuit determining the operating frequency of the generator.

5. An ultra short wave generator as claimed in claim 1, wherein there is a single pair of tubes.

6. An ultra short wave generator as claimed in claim 1 wherein there is a plurality of pairs of tubes.

7. An ultra short wave generator comprising four vacuum tubes each having a control grid co-operating with a cathode and an anode, voltage means and circuit connections for energizing said tubes, and an oscillatory circuit comprising direct connections from anode to anode of the tubes in pairs and from grid to grid of the tubes in pairs, the two grid-connected tubes being located in different pairs of the anode-connected tubes, whereby the grid-anode capacities of the tubes are serially connected, and lumped inductance included in at least one of said direct connections to resonate with said serially connected capacities to determine the frequency of oscillation, said grid-to-grid connections being substantially free from inductance.

8. An ultra short wave generator as claimed in claim 7, wherein said lumped inductance consists of inductance in each of the anode-to-anode connections.

9. An ultra short wave generator as claimed in claim 7, in combination with an energy dissipating system coupled to said inductance.

10. An ultra short wave generator comprising an even number of vacuum tubes each having a control grid cooperating with a cathode and an anode, a single circuit determining the operating frequency of the generator, said circuit including an inductance connected between the anodes of two of said tubes and circuit elements including substantially inductance-free connections between the control grids resonating in series with the grid-anode capacities of said tubes, and means completing grid-cathode and anode-cathode circuits for the tubes, said means including chokes between the cathodes of said tubes and circuit elements of high impedance at the oscillation frequency in the grid-cathode circuits.

11. An ultra short wave generator comprising a plurality of pairs of tubes each having a control grid cooperating with a cathode and an anode, means for impressing energizing potentials from cathode to grid and from cathode to anode of each tube, choke means connected between the cathodes of the tubes, and circuit elements forming a tuned circuit including in series the grid-anode capacities of the several tubes; said circuit elements including connections between the anodes of the tubes of one of said pairs, one of said connections including lumped inductance, and a substantially inductance-free connection between the grid of one tube of each pair and the grid of a tube of an adjacent pair.

12. An ultra short wave generator as claimed in claim 4, wherein there is a plurality of pairs of tubes, and said series-tuned circuit includes inductance connected from anode-to-anode of the tubes of each pair.

13. An ultra short wave generator comprising a pair of vacuum tubes each having a control grid element cooperating with a cathode and an anode element; a single series-tuned resonant circuit determining the operating frequency of the generator, said resonant circuit comprising inductance connected between one pair of like elements of the tubes, the capacities between the said elements of the respective tubes, and a substantially inductance-free connection between the other pair of like elements of said tubes; a choke having a high impedance at the oscillation frequency connected between the cathodes of the tubes; a circuit from the cathode to the grid element of each tube; a circuit from the cathode to the anode element of each tube; and an output circuit coupled to said inductance.

LESLIE HAROLD PADDLE.

CERTIFICATE OF CORRECTION.

Patent No. 2,067,679.  January 12, 1937.

LESLIE HAROLD PADDLE.

It is hereby certified that error appears in the printed specification of the above numbered patent requiring correction as follows: Page 3, first column, lines 15 and 17, claims 5 and 6 respectively, for the claim reference numeral "1" read 4; and that the said Letters Patent should be read with these corrections therein that the same may conform to the record of the case in the Patent Office.

Signed and sealed this 16th day of March, A. D. 1937.

Henry Van Arsdale
Acting Commissioner of Patents.

(Seal)